United States Patent
Mramor et al.

[11] Patent Number: 6,131,947
[45] Date of Patent: Oct. 17, 2000

[54] ELECTRICAL CONNECTOR FOR AIR BAG INFLATOR

[75] Inventors: Vincent J. Mramor, Chandler; Homer W. Fogle, Jr., Mesa, both of Ariz.

[73] Assignee: TRW Inc., Lyndhurst, Ohio

[21] Appl. No.: 09/012,636

[22] Filed: Jan. 23, 1998

[51] Int. Cl.[7] .................................................. B60R 21/32
[52] U.S. Cl. ...................... 280/735; 307/10.1; 439/188
[58] Field of Search ....................... 180/282; 280/728.1, 280/734, 735, 736; 307/10.1, 9.1, 12.1; 701/45, 47, 46; 361/247, 248, 249, 250; 439/367, 352, 188

[56] References Cited

U.S. PATENT DOCUMENTS

| | | | |
|---|---|---|---|
| 3,966,224 | 6/1976 | Campbell et al. | 280/735 |
| 5,314,345 | 5/1994 | Cahaly et al. . | |
| 5,398,965 | 3/1995 | Guirlando et al. | 280/735 |
| 5,529,338 | 6/1996 | Thompson . | |
| 5,613,702 | 3/1997 | Goetz | 280/735 |
| 5,631,439 | 5/1997 | Sallee et al. . | |
| 5,796,177 | 8/1998 | Werbelow et al. | 307/10.1 |
| 5,863,067 | 1/1999 | Blumenthal et al. | 280/741 |
| 5,880,534 | 3/1999 | Mossi et al. | 307/10.1 |
| 5,895,282 | 4/1999 | Little . | |
| 5,924,885 | 1/1999 | Pacher | 439/352 |
| 5,950,973 | 9/1999 | Verma . | |
| 5,993,230 | 11/1999 | Gauker et al. | 439/188 |

*Primary Examiner*—J. J. Swann
*Assistant Examiner*—Christopher Bottorff
*Attorney, Agent, or Firm*—Tarolli, Sundheim, Covell, Tummino & Szabo L.L.P.

[57] ABSTRACT

A vehicle safety apparatus (12) includes an inflatable vehicle occupant protection device (44) and first and second electrically actuatable devices (30, 32) for, when actuated, effecting flow of inflation fluid for inflating the inflatable device. The apparatus (12) further includes an electrical connector (10) electrically connected with the first and second actuatable devices (30, 32) for supplying electric current to the first and second electrically actuatable devices. The electrical connector (10) includes electrical components, such as diodes, (80, 82) responsive to the direction of current flow through the electrical connector for actuating a selected one of the first and second actuatable devices (30, 32).

9 Claims, 2 Drawing Sheets

ELECTRICAL CONNECTOR FOR AIR BAG INFLATOR

BACKGROUND OF THE INVENTION

1. Technical Field

The present invention relates to an electrical connector and, more particularly, to an electrical connector for an air bag inflator.

2. Description of the Prior Art

It is known to inflate an air bag to help protect an occupant of a vehicle. The air bag is inflated by inflation fluid from an inflator. The inflator is actuated by an electric signal from electric circuitry of the vehicle.

Some air bag inflators include two independently actuatable inflation fluid sources for controlling inflation of the air bag. One or both of the inflation fluid sources may be actuated, depending on the actuating signal received from the vehicle electric circuitry. Typically, two separate electrical connectors are used to transmit separate actuating signals to the two inflation fluid sources. Each connector has its own set of lead wires; thus, four lead wires altogether are used.

SUMMARY OF THE INVENTION

The present invention is a vehicle safety apparatus comprising an inflatable vehicle occupant protection device. The apparatus includes first and second electrically actuatable devices for, when actuated, effecting flow of inflation fluid for inflating the inflatable device. The apparatus further includes an electrical connector electrically connected with the first and second actuatable devices, respectively, for supplying electric current to the first and second electrically actuatable devices. The electrical connector includes means responsive to the direction of current flow through the electrical connector for actuating a selected one of the first and second actuatable devices.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENTS

Figure 1:
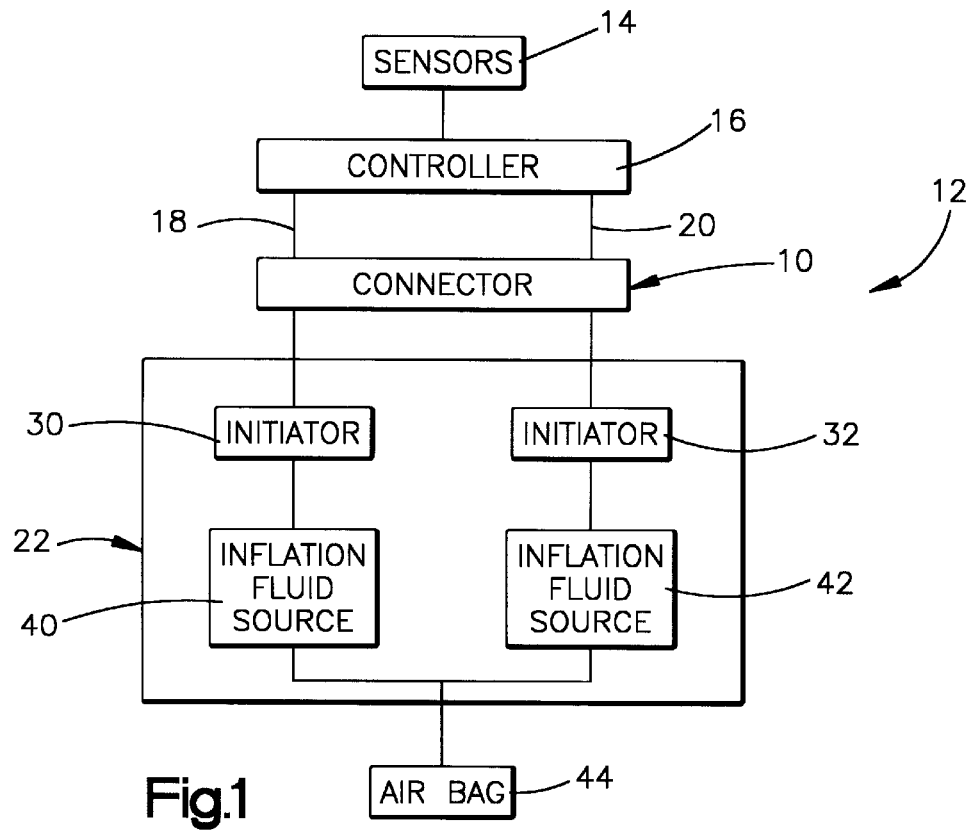
FIG. 1 is a schematic illustration of a vehicle safety apparatus including an electrical connector constructed in accordance with the present invention.

The present invention relates to an electrical connector and, more particularly, to an electrical connector for an air bag inflator. The present invention is applicable to various electrical connector constructions. As representative of the present invention, FIG. 1 illustrates schematically an electrical connector 10. The electrical connector 10 forms a part of a vehicle safety apparatus illustrated schematically at 12.

The vehicle safety apparatus 12 includes a plurality of sensors 14. The output of the sensors 14 is directed to vehicle electric circuitry including a controller 16. The output of the controller 16 is directed over a pair of lead wires 18 and 20 to the electrical connector 10.

The electrical connector 10 is electrically connected, in a manner described below, with an inflator 22. The inflator 22 includes first and second initiators 30 and 32 which are connected with first and second inflation fluid sources 40 and 42, respectively.

The initiators 30 and 32 are known electrically actuatable devices which, when actuated, cause inflation fluid under pressure to flow from the inflation fluid sources 40 and 42 into an air bag 44 to inflate the air bag. Each one of the initiators 30 and 32 is actuatable independently of the other initiator, as described below.

The inflation fluid sources 40 and 42 are preferably pyrotechnic inflators which use the combustion of gas-generating material to generate inflation fluid in the form of gas. Either one or both of the inflation fluid sources 40 and 42 could, alternatively, contain a stored quantity of pressurized inflation fluid, or a combination of pressurized inflation fluid and ignitable material for heating the inflation fluid.

Figure 2:
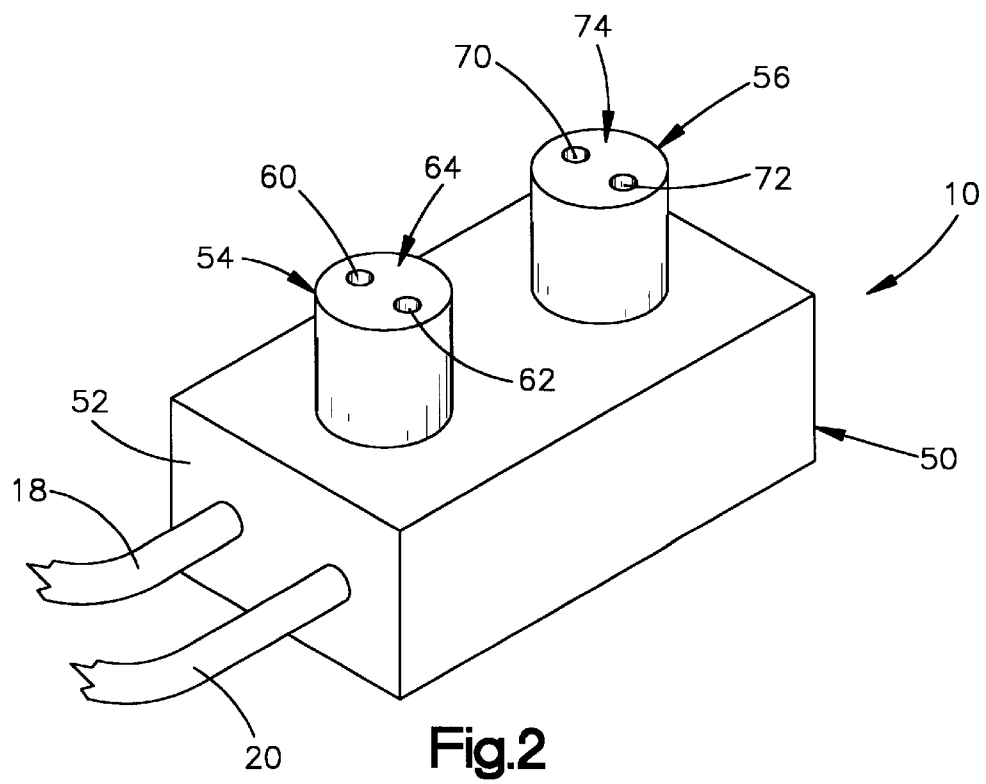
FIG. 2 is a pictorial view of the electrical connector of FIG. 1.

The electrical connector 10 (FIG. 2) includes a base 50 which is preferably formed from plastic. The lead wires 18 and 20 extend from a first end portion 52 of the base 50. First and second projecting portions 54 and 56 of the electrical connector 10 extend from the base 50. The projecting portions 54 and 56 of the electrical connector 10 are made from an electrically insulating material, such as plastic. The projecting portions 54 and 56 have a configuration adapted to mechanically interlock with a portion (not shown) of the inflator 20.

Two split cylindrical metal sleeves 60 and 62 are molded into the first projecting portion 54 of the electrical connector 10. The sleeves 60 and 62 form a first terminal 64 of the electrical connector 10. Two split cylindrical metal sleeves 70 and 72 are molded into the second projecting portion 56 of the electrical connector 10. The sleeves 70 and 72 form a second terminal 74 of the electrical connector 10.

Figure 3:
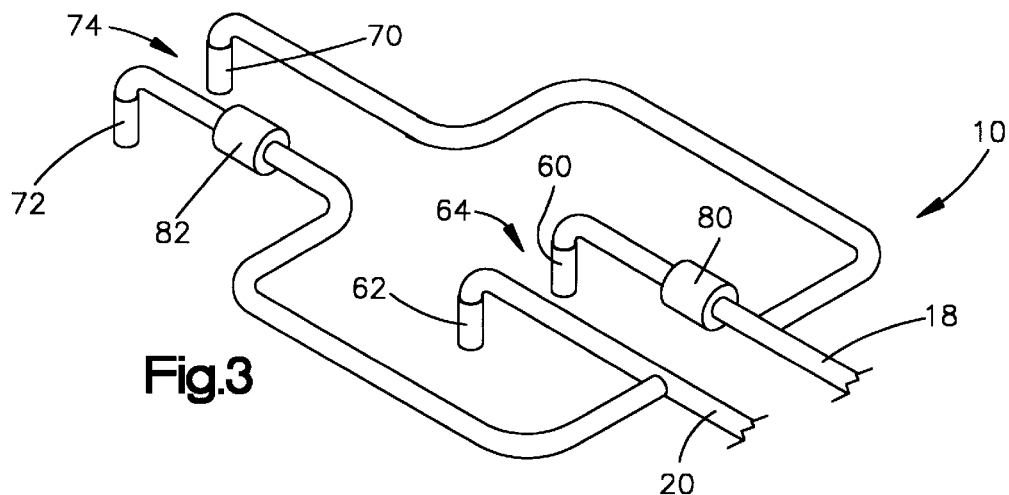
FIG. 3 is a pictorial view of internal electric circuitry of the electrical connector.
Figure 4:
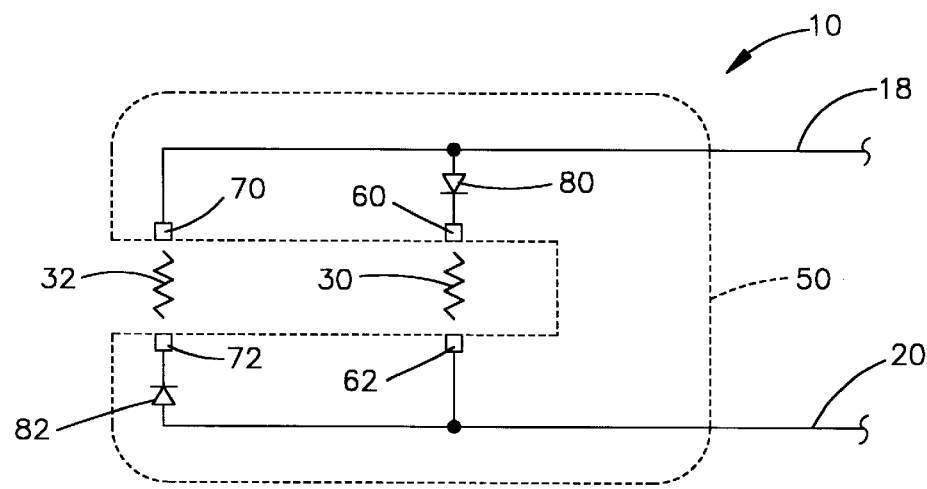
FIG. 4 is an electrical schematic diagram of the electric circuitry of FIG. 4.

The electrical connector 10 includes internal electric circuitry (FIGS. 3 and 4) connected between the lead wires 18 and 20 and the terminals 64 and 74. The circuitry includes first and second diodes 80 and 82. The diodes 80 and 82 are preferably Zener diodes with a predetermined breakdown voltage in the range of from about 5 volts to about 10 volts.

Within the connector base 50, the first diode 80 is connected between the lead wire 18 and the metal sleeve 60 in the first projecting portion 54. Current can flow through the first diode 80 in a direction from the lead wire 18 to the metal sleeve 60, regardless of the voltage potential across the first diode. The flow of current in the opposite direction through the first diode 80 is blocked, however, unless the voltage potential across the first diode exceeds the breakdown voltage of the first diode. The first lead wire 18 is, in addition, electrically connected with the metal sleeve 70 in the second terminal 74 of the electrical connector 10.

Also within the connector base 50, the second diode 82 is connected between the lead wire 20 and the metal sleeve 72 in the second projecting portion 56 of the electrical connector 10. Current can flow through the second diode 82 in a direction from the lead wire 20 to the metal sleeve 72, regardless of the voltage potential across the second diode. The flow of current in the opposite direction through the second diode 82 is blocked, however, unless the breakdown voltage of the second diode is exceeded. The second lead wire 20 is, in addition, directly connected with the metal sleeve 62 in the first terminal 64 of the electrical connector 10.

When the electrical connector 10 is connected with the inflator 20, the first projecting portion 54 of the electrical connector is mechanically engaged with a corresponding portion (not shown) of the inflator 20 The first terminal 64 is, thereby, electrically connected with the first initiator 30. The second projecting portion 56 of the electrical connector 10 is mechanically engaged with a corresponding portion (not shown) of the inflator 20. The second terminal 74 is, thereby, electrically connected with the second initiator 32.

In the event the sensors 14 sense a vehicle condition for which inflation of the air bag 44 is desired, the controller 16 sends an electric actuating signal through the lead wires 18 and 20 to the electrical connector 10. The polarity of the actuating current on the lead wires 18 and 20, that is, the direction of current flow through the electrical connector 10, is set by the controller 16 and determines which one of the two initiators 30 or 32 is actuated.

Specifically, when the actuating signal has a first polarity, the actuating current flows through the electrical connector 10 in a first direction, that is, in through the lead wire 18 and out through the lead wire 20. The first diode 80 enables flow of current through the first initiator 30. The first initiator 30 and the first inflation fluid source 40 are actuated. At the same time, a voltage potential is applied across the second diode 82. If this voltage potential is less than the breakdown voltage of the second diode 82, then the second diode blocks flow of current through the second initiator 32. The second inflation fluid source 42 is not actuated.

Alternatively, if the actuating signal has a second polarity, opposite the first polarity, then current flows through the electrical connector 10 in a second direction opposite the first direction, that is, in through the lead wire 20 and out through the lead wire 18. The second diode 82 enables flow of current through the second initiator 32. The second initiator 32 and the second inflation fluid source 42 are actuated. At the same time, a voltage potential is applied across the first diode 80. If this voltage potential is less than the breakdown voltage of the first diode 80, then the first diode blocks flow of current through the first initiator 30. The first inflation fluid source 40 is not actuated.

The controller 16 may be programmed in a known manner to actuate only one or the other of the initiators 30 and 32, or both of the initiators sequentially or together, depending on the vehicle condition sensed by the sensors 14. For example, if the sensors 14 sense the presence of an out of position vehicle occupant, then the controller 16 may be programmed to inflate the air bag 44 slowly or only partially. To accomplish this, only a selected one of the inflation fluid sources 40 and 42 is actuated, by selecting an appropriate polarity for the actuating current to energize the appropriate initiator 30 or 32.

Alternatively, if the sensors 14 sense a severe vehicle collision for which full, rapid inflation of the air bag 44 is desired, then the controller 16 may be programmed to inflate the air bag with both inflation fluid sources 40 and 42. The inflation fluid sources 40 and 42 can be actuated in rapid sequence by quickly switching the polarity of the actuating current to actuate first one and then the other of the two initiators 30 and 32. Further, both initiators 30 and 32 can be actuated simultaneously, by providing an actuating signal with a voltage potential which exceeds the breakdown voltage of both of the diodes 80 and 82.

Figure 5:
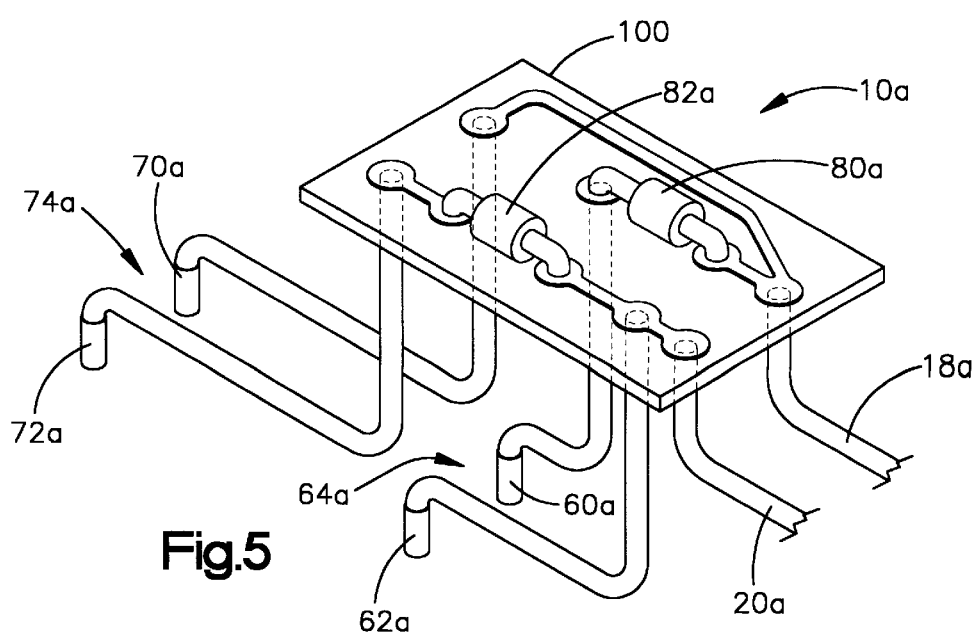
FIG. 5 is a pictorial view of internal electric circuitry of an electrical connector constructed in accordance with a second embodiment of the present invention.

FIG. 5 illustrates internal electric circuitry of an electrical connector 10*a* constructed in accordance with a second embodiment of the present invention. The electrical connector 10*a* is similar in operation to the electrical connector 10 (FIGS. 1–4), and parts of the electrical connector 10*a* which are similar to corresponding parts of the electrical connector 10 are given the same reference numerals with the suffix "a" attached.

In the electrical connector 10*a*, the diodes 80*a* and 82*a* are mounted on a printed circuit board 100 rather than being hard wired as in the embodiment of FIGS. 1–4. The printed circuit board 100 is mounted in the base 50*a* (not shown) of the electrical connector 10*a*. The electrical connections within the electrical connector 10*a* are otherwise the same as the electrical connections within the electrical connector 10. The operation of the connector 10*a* is the same as the operation of the connector 10.

From the above description of the invention, those skilled in the art will perceive improvements, changes and modifications in the invention. Such improvements, changes and modifications within the skill of the art are intended to be covered by the appended claims.

Having described the invention, We claim:

1. A vehicle safety apparatus comprising:

an inflatable vehicle occupant protection device;

first and second electrically actuatable devices for, when actuated, effecting flow of inflation fluid for inflating said inflatable device; and an electrical connector electrically connected with said first and second actuatable devices, respectively, for supplying electric current to said first and second electrically actuatable devices, said electrical connector having a housing with a first end portion, said electrical connector including first and second lead wires extending from said first end portion of said housing to said first and second electrically actuatable devices; and first and second means responsive to the direction of current flow through said electrical connector for actuating a selected one of said first and second actuatable devices, said first and second means being located within said housing;

each of one of said first and second means having a voltage potential with a predetermined breakdown potential, each one of said first and second means enabling flow of current in a first direction from said first end potion of said housing through said one means to only a selected one of said first and second actuatable devices when the voltage potential across said one diode does not exceed the breakdown potential of said one diode, said housing further including first and second projecting portions, said first projecting portion having a first terminal, said second projecting portion having a second terminal, each of said first and second terminals being formed of two cylindrical metal sleeves which are molded into each of said first and second projecting portions, respectively, said first projecting portion of said electrical connector being mechanically and electrically connected to said first actuatable device, said first means being connected within said housing between said first lead wire and said first terminal, said first lead wire having an additional connection to said second terminal of said electrical connector, said second means being connected within said housing between said second lead wire and said second terminal, said second projecting portion of said electrical connector being mechanically and electrically connected to said second actuatable device, said second lead wire having an additional connection to said first terminal of said electrical connector.

2. An apparatus as set forth in claim 1 wherein said means responsive to the direction of current flow comprises two diodes.

3. An apparatus as set forth in claim 2 wherein said diodes are mounted on a printed circuit board.

4. An apparatus as set forth in claim 1 comprising a controller for providing an electric actuating signal over said first and second lead wires to said electric connector, the voltage and polarity of said actuating signal being selectively controllable by said controller in response to sensed vehicle conditions.

5. A vehicle safety apparatus comprising:

an inflatable vehicle occupant protection device;

first and second electrically actuatable devices for, when actuated, effecting flow of inflation fluid for inflating said inflatable device; and an electrical connector including first and second projecting portions, said first projecting portion having a first terminal, said second projecting portion having a second terminal, each of said first and second terminals being formed of two cylindrical metal sleeves which are molded into each of said first and second projecting portions, respectively, said electrical connector having a housing with a first end portion;

said first and second terminals being mechanically and electrically connected with said first and second actuatable devices, respectively, for supplying electric current to said first and second electrically actuatable devices, said electrical connector including current supply means connected with said electrical connector for supplying electric current to said electrical connector, said current supply means extending from said first end portion of said housing to said first and second actuatable devices, said electrical connector including means responsive to the direction of current flow through said electrical connector for energizing a selected one of said first and second terminals thereby to actuate a selected one of said first and second actuatable devices, said first and second means being located within said housing;

said current supply means having at least two connections enabling current flow to each of said first and second terminals.

6. An apparatus as set forth in claim 5 wherein said current supply means consists essentially of first and second lead wires.

7. An apparatus as set forth in claim 6 wherein said means responsive to the direction of current flow comprises a first diode connected between said first lead wire and said first terminal and a second diode connected between said second lead wire and said second terminal.

8. An apparatus as set forth in claim 5 comprising a controller for providing an electric actuating signal over said current supply means to said electric connector, the voltage and polarity of said actuating signal being selectively controllable by said controller in response to sensed vehicle conditions.

9. An apparatus as set forth in claim 5 wherein said means responsive to the direction of current flow comprises two diodes.

\* \* \* \* \*